United States Patent [19]

Rogalla

[11] Patent Number: 5,019,268

[45] Date of Patent: May 28, 1991

[54] METHOD AND APPARATUS FOR PURIFYING WASTE WATER

[75] Inventor: Franck Rogalla, Asnieres, France

[73] Assignee: OTV (Omnium de Traitements et de Valorisation), Courbevoie, France

[21] Appl. No.: 366,385

[22] Filed: Jun. 15, 1989

[30] Foreign Application Priority Data

Jun. 16, 1988 [FR] France ................................ 88 8061

[51] Int. Cl.$^5$ ............................................. C02F 3/06
[52] U.S. Cl. ..................................... 210/617; 210/621; 210/95; 210/151; 210/195.1; 210/221.2
[58] Field of Search ............... 210/617, 618, 621, 95, 210/150, 151, 194, 195.1, 221.2, 284, 290, 503, 661

[56] References Cited

U.S. PATENT DOCUMENTS

| | | | |
|---|---|---|---|
| 3,458,436 | 7/1969 | Martinola et al. | 210/661 |
| 3,471,025 | 10/1969 | Dobson | 210/290 |
| 4,086,162 | 4/1978 | Benzaria | 210/661 |
| 4,159,244 | 6/1979 | Amagi et al. | 210/928 |
| 4,253,947 | 3/1981 | Fan et al. | 210/618 |
| 4,322,296 | 3/1982 | Fan et al. | 210/618 |
| 4,461,708 | 7/1984 | Hakulinen et al. | 210/617 |
| 4,582,600 | 4/1986 | Atkinson | 210/194 |
| 4,612,115 | 9/1986 | Titoff | 210/618 |
| 4,624,789 | 11/1986 | Fan et al. | 210/661 |
| 4,800,021 | 1/1989 | Desbos | 210/618 |

FOREIGN PATENT DOCUMENTS 256506 5/1988 German Democratic Rep. .
63-232892 9/1988 Japan .

Primary Examiner—W. Gary Jones
Assistant Examiner—Christopher Upton
Attorney, Agent, or Firm—Browdy and Neimark

[57] ABSTRACT

A process and apparatus for biological purification of waste water wherein waste water and oxygenated gas are introduced into a reactor using ascending cocurrents. The reactor is equipped with a lower fluidized bed and an upper fixed bed for filtration. The particles in the beds are composed of expanded materials having a density less than 1. The particles in the fixed bed are both smaller and lighter than those of the fluidized bed.

8 Claims, 3 Drawing Sheets

METHOD AND APPARATUS FOR PURIFYING WASTE WATER

FIELD OF THE INVENTION

This invention pertains to the area of biological purification of waste water, especially city water, industrial water and distribution water to be made into drinking water. It specifically pertains to a purification process wherein the water to be treated and oxygenated gas are sent in ascending co-currents in the same reactor or biological filter equipped with expanded mineral or plastic materials less dense than water as a filtering material.

BACKGROUND OF THE INVENTION

It is known that the biological treatment, for example, of water, consists of breaking down organic impurities through the action of a free or fixed purifying biomass housing various microorganisms; bacteria, yeast, protozoans, metazoans, etc. In the free biomass process, using activated sludge, it is impossible to concentrate a great number of different species of microorganisms, which are difficult to decant to the extent that the concentration of the biomass is formed by decanting. The process is thus limited in terms of the applicable load in BOD (biological oxygen demand) and COD (chemical oxygen demand). In a fixed biomass system, the biomass (with bacteria) is concentrated using a collection medium. Suitability for decantation in this case is no longer of vital importance, and the purifying potential of this technique is far superior to the conventional processes.

Among the most efficient processes based on the fixed biomass purification principle, those patented and developed by the present inventor can be cited, including the "Biocarbone" (registered trademark) process, and the technique of using a granular bed composed of two areas having different granulometric and biological characteristics in one ascending water current reactor (French Pat. No. 76.21246 published under No. 2 358 362; No. 78.30282 published under No. 2 439 749; No. 86.13675 published under No. 2 604 990).

In the "free biomass" techniques, in this case, we will refer primarily to fluidized bed processes, wherein products having a density less than 1 are used for the biofilter material, such as, for example, expanded polymers, according to processes now in the public domain (French Pat. No. 1 363 510 of 1963; English Pat. No. 1 034 076 of 1962) whose various embodiments have yielded numerous patents (French Pat. Nos. 2 330 652; No. 2 406 664; No. 2 538 800; U.S. Pat. No. 4,256,573; Japanese Pat. No. 58-153 590, etc.).

The implementation of said floating materials and fluidized granular beds is advantageous in and of itself but involves certain problems and often presents disadvantages, several of which were brought to light by lengthy tests conducted by the present inventor. For example, in a biofilter with ascending water current on balls or granules less dense than water, if air is injected into the base of the filtering bed, filtration cycle lengths are unacceptable and the surface layer is quickly consolidated by suspended materials blocking the passage of the air bubbles; in this case, frequent washings are necessary. Moreover, when materials heavier than water (sand or similar materials) are fluidized, a considerable energy supply is required to pump the liquid, and it is difficult to keep the material inside the reactor. To correct this energy consumption problem, it was proposed to use a fluidized bed of light materials with air intake at the base of the bed, but with a descending water feed (U.S. Pat. No. 4,256,573 and Japanese Pat. No. 58.153590 cited above). However, beginning at certain descending water speeds, air bubbles become trapped inside the material or are carried by the flux of liquid, and the reactor cannot be aerated properly.

To remedy the aforementioned problems, the present inventor conducted extensive experiments in order to use all the advantages of a floating or fluidized bed, while attempting to eliminate the phenomena of the trapping of bubbles at the surface, the consolidation of the bed, energy expenditures, problems in washing the filtering bed, etc.

SUMMARY OF THE INVENTION

These problems were solved through the discovery and subsequent development of a system wherein, in a single reactor or biological filter with ascending co-currents of water and oxygenated gas, the following is used as a means of filtration and bacterial medium, in two adjacent areas: a lower layer consisting of a fluidized bed of particles less dense than water, and an upper layer made of a fixed bed of particles also less dense than 1, but smaller and lighter. In practice, according to one advantageous embodiment, our goal is to satisfy the following equation on a general basis:

$$\frac{D1}{D2} = \frac{S2 - SL}{S1 - SL} \quad (1)$$

Where D1, S1 correspond respectively to the average diameter of the particles and the volume mass of the lower bed. D2, S2: the same definitions as above, but for the upper bed, with SL being the volume mass of the liquid.

For the combination of the two aforementioned superposed beds, the process according to the invention thus implements materials that are lighter than water but whose properties of granulometry, density, bed height (as explained in the description below) are different to obtain on the one hand a fluidization of the lower bed during the injection of the oxygenated gas without appreciable perturbation of the upper bed, and, on the other hand, an "automatic" reclassification of the two layers or beds during the phase in which the light materials expand when washed with a countercurrent. Said functions are substantially fulfilled when equation (1) above is satisfied. At rest, these two layers of materials lighter than water stick together because of their different densities. This classification is maintained while the filter is washed with the countercurrent. When air is introduced into the base of the filter by a diffusion device, the air and water mixture passing through the materials has a similar density to the particles in the aforementioned lower layer. The lower bed in this case is fluidized by the ascending movement of the oxygenated gas bubbles, which causes an intensive exchange between the gasses, the water to be treated and the "biofilm" which adheres to the particles of the bed.

According to one advantageous arrangement of the invention, the upper surface of the upper fixed bed as defined above is overmounted by a support layer of particles also made of a light material whose characteristics are defined below.

In practice, the parameters and characteristics of the different layers of beds can be defined advantageously as follows: for the lower fluidized bed, the granulometry (D1) can vary from 3 to 15 mm, the volume mass is generally between 300 and 800 g/l and the height of the bed ranges from 0.2 to 2 meters depending on the type of reactor used; in the upper fixed bed, the average diameter of the light particles (D2) is from 1 to 10 mm, while the volume mass (S2) varies from 20 to 100 G/l and the height can vary from 0.5 to 3 meters. Finally, in the case of the aforementioned variation, the upper layer overmounting the upper bed comprises particles from 3 to 20 mm in size, having a volume mass of 10 to 50 g/l and a height or thickness of 0.10 to 0.50 meters.

The particles of light materials that can be used as a filtering medium/bacterial support covered by the invention are products known in and of themselves. To this end, we can use: expanded plastic materials, closed-cell materials from polyolefins, polystyrene, synthetic rubber polymers and copolymers, etc.; light mineral materials such as clay or expanded shale, or cellulosic products such as wood particles, for example. The granulates of these materials can be in various forms, such as, advantageously: balls, cylindrical pods, etc. In practice, for the effective execution of the process, it is important for the densities of the light particles used within the context of the invention to be increasingly low as we move from the lower layer (fluidized bed) to the upper layer, and then to the aforementioned support layer. For example, the density ranges can respectively be: 0.5 to 0.8 (fluidized bed); 0.3 to 0.1 (fixed bed) and 0.005 to 0.08 (upper support bed).

Additional characteristics of the process will be brought to light in the rest of this description.

The invention also has as an object a reactor or biological filter comprising the following from bottom to top: an area for the thickening and removal of purification sludge; an air injection device; a filtering material area composed of a first layer of light particles (fluidized bed) and a second layer of less-dense light particles (fixed bed), which is overmounted by a support layer of even lighter particles; a ceiling made of concrete or another perforated material; and, finally, at the top of the reactor, a wash water reserve area having the treated effluent outlet at its top.

BRIEF DESCRIPTION OF THE DRAWINGS

A non-restrictive embodiment of a water treatment facility is illustrated in the skeleton diagram in FIG. 1 annexed below.

DETAILED DESCRIPTION OF THE INVENTION

Figure 1:
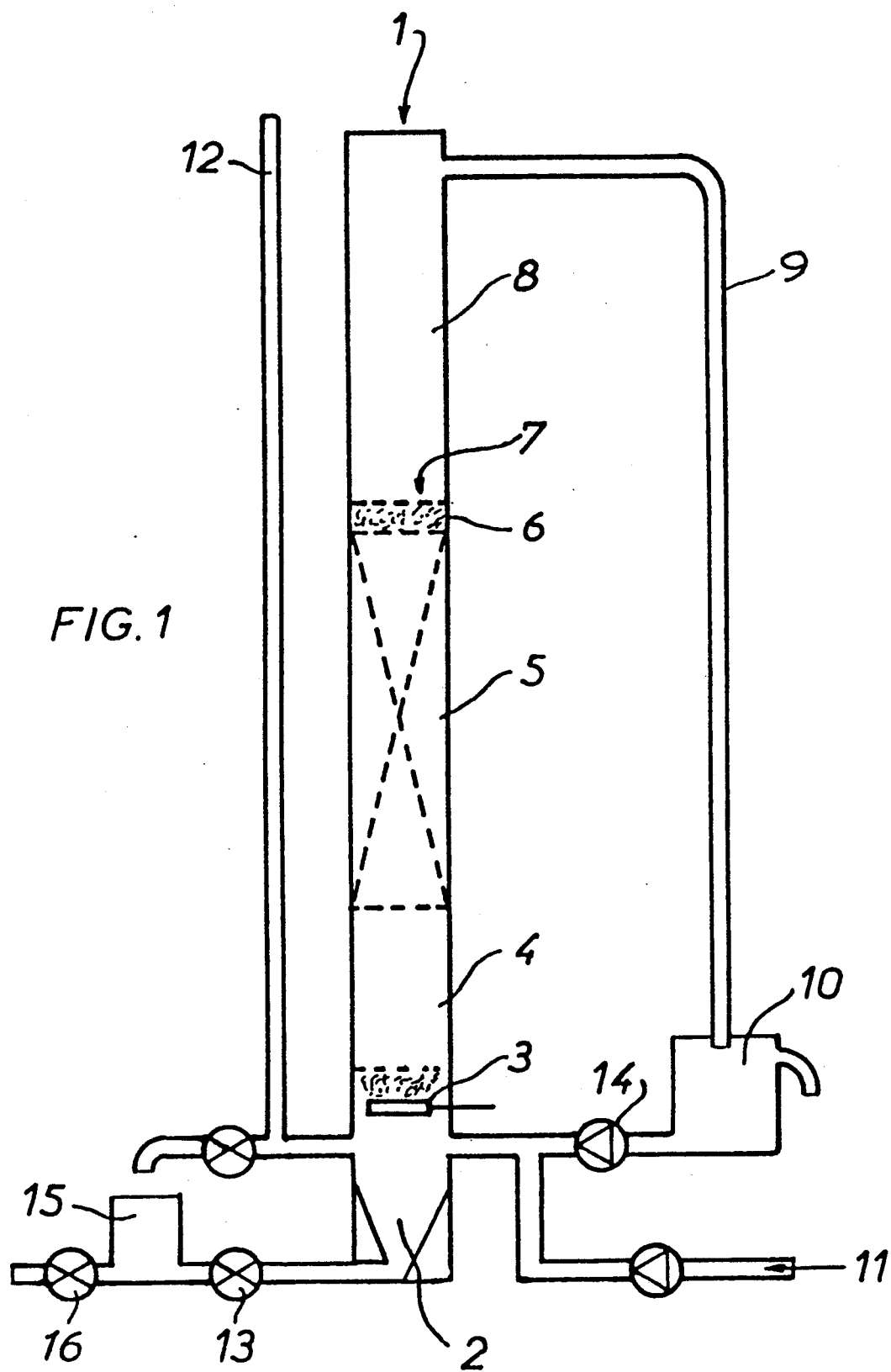

Reactor 1 thus comprises in its lower part space 2 for the thickening and removal of sludge, then oxygenated fluid injection system 3, the bed 4 which operates under fluidization, part 5 of the fixed bed, then upper support layer 2 held by perforated plate 7 serving as a ceiling; and finally upper free zone 8 serving as a washing reserve where treated water is removed through pipe 9 and collected in 10.

The liquid to be treated arrives through pipe 11 and is introduced into area 2 under oxygenated gas injection device 3; the latter can be under bed 4 as indicated in the figure, or in the lower part of said bed. As explained above: at rest, layers or beds 4, 5 and 6 remain one on top of the other because of their different densities; when air (or oxygenated gas) is introduced into the base via 3, the mixture of air and water fluidizes the particles of bed 4 through the movement of the bubbles, which permits an intensive exchange between the gas, the water to be treated and the biofilm that adheres to the particles. During said operation, bed 5 and upper layer 6 remain in a non-turbulent mode (thus the expression "fixed bed" used in this description). Because of the accumulation of suspended materials and the biological growth inside the filtering bed, the material progressively consolidates. The increase in load loss can be monitored by manometric measurements or by the increase in the level of liquid in the column 12 for loading or measuring the load loss. Particle retention can be improved by adding a flocculent.

When a pre-defined load loss value is reached, the washing of the bed is triggered. For this purpose, a flush valve 13 is opened until the desired washing speed is reached. The rapid flow of the countercurrent of liquid treated and stored in the upper part 8 of the reactor allows the material to expand. For each granulometry and density of the material, the washing speed can be selected as a function of the desired expansion of the material.

The rapid passage of the countercurrent makes it possible to move the stored materials into the interstitial spaces and to disengage the excess biomass accumulated on the surface of the material, but the wash speed can be selected to maintain an active biofilm on the material. After reserve 8 is drained and valve 13 is closed, this makes it possible to restart the feed with a load similar to the load before washing.

The injection of the effluent 11 supply at the top of decantation compartment 2 permits the sludge to be thickened as the purification process occurs in the granular bed. The sludge itself is collected in compartment 15 and removed by pump 16. Purified effluent is recycled by a pump 14 making it possible to improve distribution or to add nitrates in the pre-filtering area, if applicable.

To extend the periods between washings, very brief flushes of water can be produced periodically by opening valve 13 in order to deconsolidate the material and permit impurities to penetrate more deeply into the filtering bed. These mini-washings will further deconsolidate the lower part of the filter, which is more heavily loaded with suspended materials. Rapid flushes can be triggered to ensure a balanced load loss over the entire height of the filtration medium. This makes it possible to dispense with adjustment components for the equal division of oxygenated gas and water.

In order to prevent excessive compression of the bed by continuous intake, a pulsation of air or oxygenated gas can be provided. The air intake can be maintained during the washing operation, pulsed or otherwise, to promote the deconsolidation of the bed.

According to one advantageous embodiment of the process, a set of filters can be combined. A common water supply feeds the individual loading columns for each filter. The loading columns prevent the excess pressure created by any accidental consolidation that may occur, while offsetting the consolidation on a continuous basis. With this gravitational feed, the flow can be easily measured and regulated using downspouts.

The wash water storage compartments for a set of filters are hydraulically connected. In this way, purified water in the operating filters feeds the wash flow for the filter being deconsolidated, which makes it possible to produce the height and volume of the storage compartments superposed over the filtering bed, the dimensions being calculated as a function of the flow and the number of filters.

Figure 2:
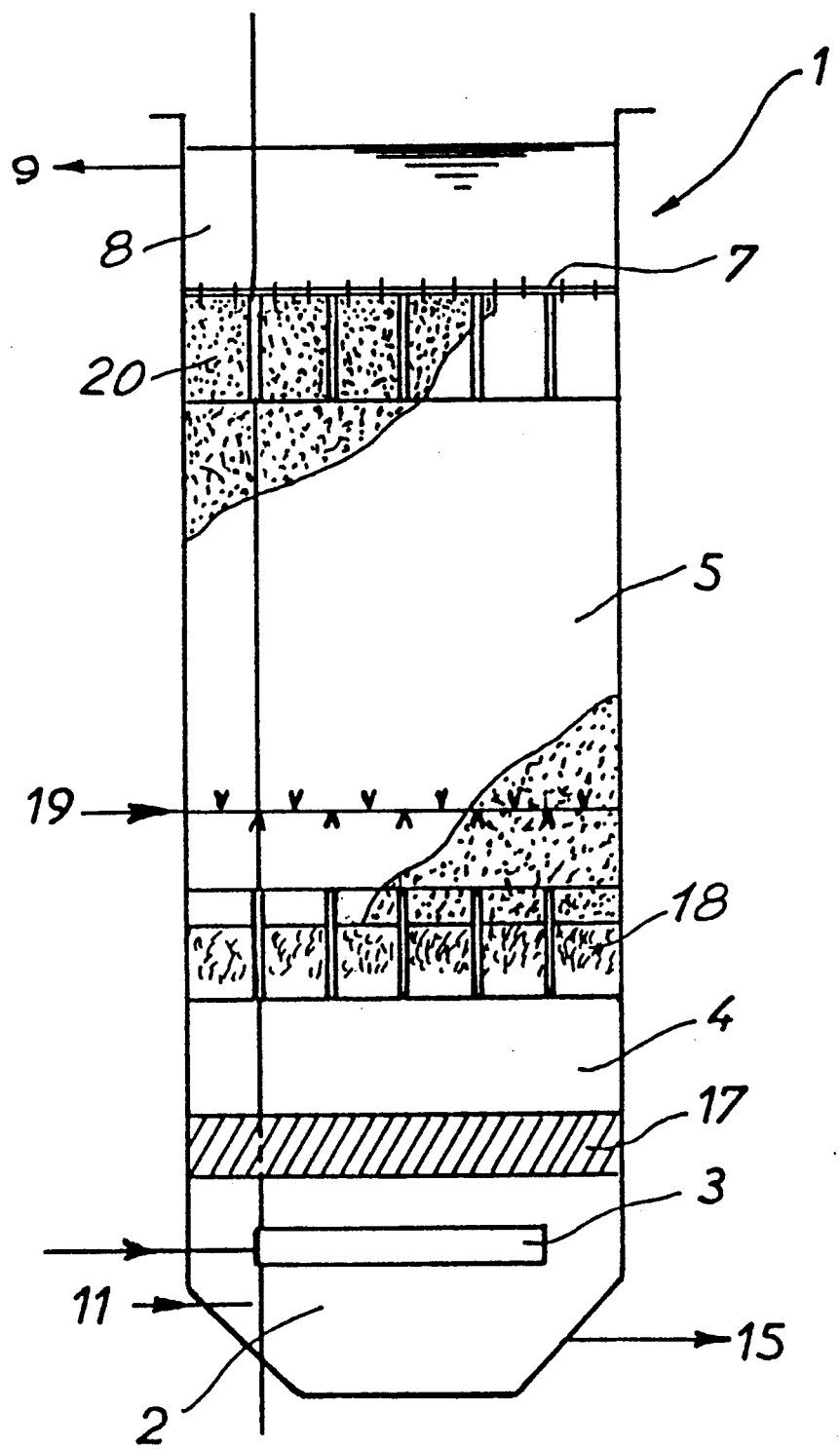
FIG. 2 shows another embodiment of the water treatment facility according to the present invention.

Another water treatment facility according to the invention but comprising different variations in the embodiment and implementation of the single rector is illustrated in FIG. 2 of the attached drawings.

According to a first variation, the oxygenated gas (or air) sprayer 3 can be replaced with an introduction of "white" water, i.e., water saturated with air bubbles, produced in the known manner by spraying air into water under pressure. If desired, this water can be composed of part of the treated water coming out in 9 through the upper part of the reactor.

According to a second characteristic, packing 17 advantageously composed of textile materials, for example, crossed filaments of geotextiles or equivalent products, is introduced into the lower part of reactor 1 at the base of the bed 4 to be fluidized. Said packing, designed to allow air and water to pass through it, serves as a medium for fixed bacteria and serves to extract part of the impurities in the water to be treated when it reaches reactor 1 (through 11).

According to another variation, we installed equally-divided compartments 18 at the material-water interface level. These compartments, in grid or grate form, permit the oxygenation fluid, the feed water to be treated and the wash flow to be distributed and channeled uniformly. It also makes it possible to break up the compact mass or plug formed by the filtration material during the final wash in the form of a water flush.

According to another characteristic, a second injection rack 19 can be installed at the level of fixed bed 5, designed to stir the material-water interface area. The injection can consist either of oxygenated fluid (or white water) or of pressurized sweeping water. In this way, surface consolidation can be avoided and more effectively disengaged when it occurs.

Finally, according to another variation also illustrated in FIG. 2, another compartmentalization 20 can be provided under ceiling 7 of the reactor. This compartmentalization, of the same type as the one 18 described above serves especially to promote the equal division of treated effluent and oxygenation fluid.

In order to highlight the advantages of the process and facility according to the invention, we will describe excerpts from some sample embodiments, on an illustrative basis.

EXAMPLE 1

Using the process according to the invention, various types of waste water were treated in a pilot facility of the same type as in FIG. 1 in the attached drawings, according to two variations of reactors whose characteristics are listed below:

TABLE 1

| Bed Parameter | Reactor 1 | Reactor 2 |
|---|---|---|
| Retention system (7) | metal sieve with 2-mm slits | roughened ceiling openings of 2 mm |
| Support layer (6) | expanded polystyrene | expanded polystyrene |
| Density | 0.01 | 0.02 |
| Granulometry (mm) | 6 to 10 | 3 to 5 |
| Height (m) | 0.20 | 0.30 |
| Filtration layer (5) | expanded polyethylene | expanded polyethylene |

TABLE 1-continued

| Bed Parameter | Reactor 1 | Reactor 2 |
|---|---|---|
| Density | 0.03 | 0.03 |
| Granulometry | 3 to 5 | 2 to 3 |
| Height (m) | 1.5 | 2.5 |
| Fluidized bed layer (4) | lightened polypropylene | expanded shale |
| Density | 0.8 | 0.6 |
| Granulometry (mm) | 10 to 15 | 5 to 6 |
| Height (m) | 1.5 | 0.5 |

The other main characteristics and primary performances obtained are summarized in the table below:

TABLE 2

| | | |
|---|---|---|
| Flows of water to be treated (l/hr) | 120 | 120 |
| Air | 250 | 1500 |
| Filter surface (m$^2$) | 0.03 | 0.5 |
| Treatment temperature (°C.) | 15 | 15 |
| Volume loads applied (Kg/m$^3$-day) | | |
| COD | 15 | 5 |
| BOD | 7.5 | 2.5 |
| NTK | | |
| Input effluent (mg/l) | | |
| COD | 500 | 500 |
| BOD | 250 | 250 |
| MES | 200 | 200 |
| NTK | 50 | 50 |
| Output effluent (mg/l) | | |
| COD | 70 | 50 |
| BOD | 20 | 10 |
| MES | 20 | 10 |
| NTK | 30 | 5 |

Note: The volume load applied corresponds to the amount of COD, BOD and NTK treated per m$^3$ of filter in 24 hours.

| Yield (%) | Reactor 1 | Reactor 2 |
|---|---|---|
| COD | 86 | 90 |
| BOD | 92 | 96 |
| NTK | 40 | 90 |

MES = Suspended materials
NTK = Kjeldahl organic nitrogen.

EXAMPLE 2

The tests described below concern processing surface water to be made into drinking water, especially for biological nitrification, in a reactor of the same type as in FIG. 1.

The material in the fluidized bed was composed of expanded shale having a density of 0.5, a granulometry of approximately 2 mm over a height of 0.50 m. The filtering layer or fixed bed was composed of expanded polystyrene having a density of 0.03 and a granulometry of 1 mm, over a height of 0.5 m. In this case, there was no support layer over the fixed bed.

The operating temperature was approximately 10° C. with a filtering speed of 10 m/hour, an aeration speed of 5 m/hour, using air.

It was found that the NH$_4$ content decreased an average of 3.5 to 0.1 mg/l from input (effluent to be treated) to output (denitrified water).

Of course, within the context of the invention, one or more variations of the embodiments illustrated in FIG. 2 can be implemented. Moreover, the feed of effluent and/or oxygenated gas may be intermittent.

Figure 3:
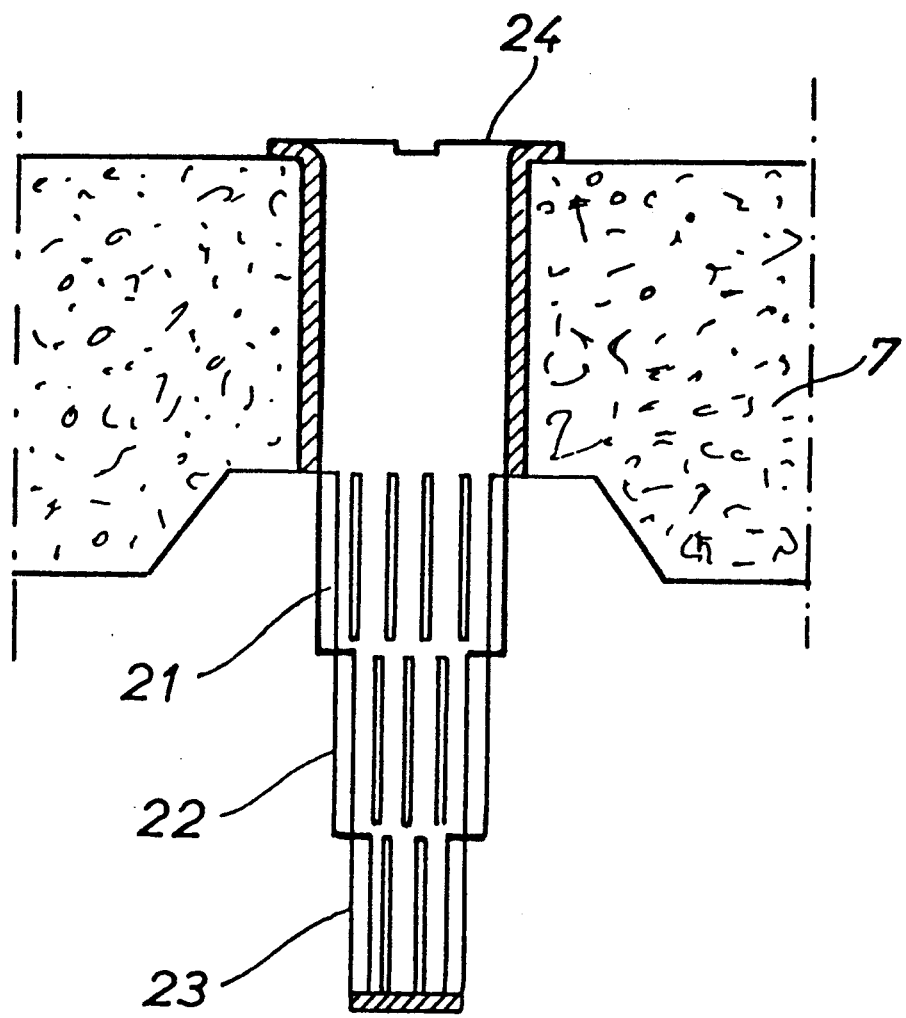
FIG. 3 shows another embodiment of the water treatment facility according to the present invention.

According to an advantageous arrangement illustrated in FIG. 3 of the drawings, the retention device or ceiling (7) can be equipped with sieves, making it possible to create a sufficiently low load loss during washing to prevent the height of water needed from rising above the ceiling (7). According to a particularly advantageous embodiment, these sieves are designed to be screwed directly in decreasing diameters (21, 22, 23) with a protective grid over 24, if necessary, at the top of the reactor at the ceiling (7) level. This makes it possible to prevent any manipulation of the beds.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A process for the biological purification of waste water by treating with oxygenated gas using ascending co-currents in a single reactor containing as filtering means a lower fluidized bed zone and an upper fixed bed zone, the improvement wherein the beds contain particles consisting of expanded materials having a density lower than the density of water, the particles of the fixed bed being both smaller and lighter than the particles of the fluidized bed, wherein the arrangement of particles and beds satisfies the following equation:

$$\frac{D1}{D2} = \frac{S2 - SL}{S1 - SL}$$

wherein $D1$ is the average diameter of the particles of the lower fluidized bed, $S1$ is the volume mass of the lower fluidized bed, $D2$ is the average diameter of the particles of the upper bed, $S2$ is the volume mass of the particles of the upper bed, and $SL$ is the volume mass of the liquid; and wherein $D1$ is about 3 to about 15 mm, $D2$ is about 1 to about 10 mm, $S1$ is about 300 to bout 800 g/l; $S2$ is bout 20 to 100 g/l; the height of the fluidized bed being from about 0.2 to about 2 meters and the height of the fixed bed being from about 0.5 to about 3 meters.

2. A reactor for biological purification of waste water, comprising the following elements, from bottom to top:

a sludge thickening and removal area;

means for injecting oxygenated gas;

a filtering material area comprising a first layer of light particles in a fluidized bed, a second layer of less-dense particles in a fixed bed, and a support layer over said fixed bed, said support layer containing lighter particles than the particles of said fixed bed, all the particles being lighter than water, and the said support layer being covered by a retention device;

a wash water reserve area having at the top thereof an outlet for treated water;

pump means for recycling treated water and introducing the recycled water at the base of the reactor;

pressure measurement means including a column for measuring pressure of water flow in said reactor, said column being connected to the base of the reactor; and a receptacle for sludge collection.

3. The reactor according to claim 2 further including flushing means for washing of the beds with a descending countercurrent of water and for the expansion of the granular beds, said flushing means including a water flush valve.

4. The reactor according to claim 2 further comprising means for flowing the waste water flow intermittently and for interspersing said flowing with rapid flushes of water.

5. The reactor according to claim 2 further including a grid-type system for partition into compartments, disposed between the two said beds and at the top of said reactor.

6. The reactor according to claim 5 wherein the fluidized bed includes at the base thereof a packing made of textile materials.

7. The reactor according to claim 5 further comprising within the fixed bed a second means for injecting oxygenated gas and flush water under pressure.

8. The reactor according to claim 2 wherein said retention device further includes strainers which attached to the top of the reactor.

* * * * *